United States Patent [19]
Grossman et al.

[11] Patent Number: 5,093,086
[45] Date of Patent: Mar. 3, 1992

[54] PACKED BED REACTOR FOR PHOTOCHEMICAL $^{196}$HG ISOTOPE SEPARATION

[75] Inventors: Mark W. Grossman, Belmont; Richard Speer, Reading, both of Mass.

[73] Assignee: GTE Products Corporation, Danvers, Mass.

[21] Appl. No.: 289,168

[22] Filed: Dec. 23, 1988

[51] Int. Cl.$^5$ .............................................. C01B 43/00
[52] U.S. Cl. ................................. 422/186; 422/186.3; 422/159; 204/157.2; 204/157.21; 204/157.22
[58] Field of Search ............. 422/186, 186.3, 159; 250/489, 435, 42 BP, 436; 204/157.2, 157.21, 157.22

[56] References Cited

U.S. PATENT DOCUMENTS

| | | | |
|---|---|---|---|
| 3,379,252 | 4/1968 | Work | 313/485 |
| 3,897,331 | 7/1975 | Smith et al. | 209/10 |
| 3,944,825 | 3/1976 | Levy et al. | 250/282 |
| 3,983,019 | 9/1976 | Botter nee Bergheaud | 204/157 R |
| 4,456,512 | 6/1984 | Bieler et al. | 204/162 |
| 4,514,363 | 4/1985 | Durbin | 423/3 |
| 4,527,086 | 7/1985 | Maya | 313/485 |
| 4,584,073 | 4/1986 | Lahoda et al. | 204/157.2 |
| 4,620,909 | 11/1986 | Keyser et al. | 204/157.2 |
| 4,623,372 | 11/1986 | Adler et al. | 62/532 |
| 4,676,956 | 6/1987 | Mori | 422/186 |
| 4,678,550 | 7/1987 | Grossman | 204/105 R |
| 4,713,547 | 12/1987 | Grossman | 250/373 |

FOREIGN PATENT DOCUMENTS 280788 12/1987 European Pat. Off. .
281687 12/1987 European Pat. Off. .

OTHER PUBLICATIONS

Grossman, U.S. Ser. No. 815,150—filed: Dec. 31, 1985.
Waymouth, Electric Discharge Lamps, MIT Press (1971).
Webster and Zare, J. Phys. Chem. 85: 1302–1305 (1981).
Maya et al., Science, 26:435–436 (1984).

Primary Examiner—Brooks H. Hunt
Assistant Examiner—Ngoclan T. Mai
Attorney, Agent, or Firm—Ernest V. Linek

[57] ABSTRACT

Straight tubes and randomly oriented pieces of tubing having been employed in a photochemical mercury enrichment reactor and have been found to improve the enrichment factor (E) and utilization (U) compared to a non-packed reactor. One preferred embodiment of this system uses a moving bed (via gravity) for random packing.

5 Claims, 5 Drawing Sheets

PACKED BED REACTOR FOR PHOTOCHEMICAL $^{196}$HG ISOTOPE SEPARATION

STATEMENT OF GOVERNMENT INTEREST

The Government of the United States of America has rights in this invention pursuant to Subcontract 4540710 under prime Contract DE-AC03-76SF00098 awarded by the Department of Energy.

FIELD OF THE INVENTION

The present invention is directed to a method and apparatus useful in the isotopic enrichment of a predetermined isotope of mercury (Hg) from a naturally occurring mercury mixture. While the present invention may be used in the enrichment of any one of the seven naturally occurring isotopes of mercury ($^{202}$Hg, $^{200}$Hg, $^{199}$Hg, $^{201}$Hg, $^{198}$Hg, $^{204}$Hg, and $^{196}$Hg,) it has particularly advantageous application in the enrichment of the $^{196}$Hg isotope, which has a natural abundance of only about 0.146 percent.

BACKGROUND OF THE INVENTION

Many devices utilize mercury in their operation, particularly in the field of electric lamps and lighting. Such devices include arc discharge lamps which typically employ mercury as one of the vaporizable components therein. See, for example, Waymouth, *Electric Discharge Lamps*, MIT Press 1971 for a description of the basic principles of such lamps.

In U.S. Pat. No. 4,379,252, (the '252 patent), the advantages of utilizing higher than normal levels of $^{196}$Hg in the Hg added to fluorescent lamps are described and include unexpectedly high efficiency gains in light output. The disclosure of this paten is hereby incorporated herein by reference.

The drawback of using this isotope lies in its high cost. For example, using conventional enrichment techniques, mercury which has been enhanced to contain about 35% of the $^{196}$Hg isotope can cost about $500 per milligram. While only sub-milligram quantities of this isotope need be added to an incandescent lamp to afford beneficial results, economic realities always play a part in consumer products. Accordingly, it is easy to understand why more economical methods of obtaining this isotope continue to be sought.

Isotopically enriched mercury can be produced by a number of methods. One method involves photosensitized chemical reactions utilizing elemental mercury and various compounds. The compounds HCl and $O_2$ react with mercury atoms when the mercury atoms are excited by resonance radiation, in particular, 2537 Å radiation produced in a Hg ($^3$P - $^1$S$_o$) transition generating isotopically selective reactions. Thus, the Hg compound formed contains Hg enriched in a particular isotope, and the Hg must be separated from the compound into its liquid or free state (i.e., elemental Hg)) in order to recover the isotopically enriched metal.

The following additional documents are recited as general background information with respect to the subject matter of the present invention. To the extent deemed necessary by artisans of ordinary skill in the art to which this invention pertains, the teachings of these documents are hereby incorporated herein by reference.

Grossman, U.S. Pat. No. 4,713,547;
Grossman et al., U.S. Pat. No. 4,678,550;
Maya, U.S. Pat. No. 4,527,086;
Durbin, U.S. Pat. No. 4,514,363;
Work et al., U.S. Pat. No. 3,379,252;
Botter nee Bergheaud et al., U.S. Pat. No. 3,983,019;
Smith et al., U.S. Pat. No. 3,897,331;
Grossman et al., U.S. Ser. No. 815,150, filed Dec. 31, 1985;
European Pat. Publication No. 0 281 687, published Sept. 14, 1988, claiming priority of U.S. Ser. No. 947,217, filed Dec. 29, 1986; and
European Pat. Publication No. 0 280 788, published Sept. 7, 1988, claiming priority of U.S. Ser. No. 947,216, filed Dec. 29, 1986.

SUMMARY OF THE INVENTION

The present invention is directed to an improved photochemical reactor useful for the isotopic enrichment of a predetermined isotope of mercury, especially, $^{196}$Hg.

The present invention is based upon the discovery that straight tubes and randomly oriented pieces of tubing can be employed in a photochemical mercury enrichment reactor to improve the enrichment factor (E) and utilization (U) compared to a non-packed reactor.

It has further been discovered that for similar mercury flow rates, mercury density, reactor geometry, reactor wall temperature, U.V. radiation conditions, and reactor temperature, the use of randomly oriented sections of quartz tubing as a fixed packed bed has resulted in a substantial improvement in processing yields. The discovery that product partial pressure and surface adhesion were critical in $^{196}$Hg process development served as a partial motivation for first use of this type of packing.

One preferred embodiment of this system uses a moving bed (via gravity) for random packing. Simple modeling of this system indicates that the required length of a stationary bed, or alternatively, the required residence time for a moving bed, to obtain reasonable utilization.

In a further embodiment of the present invention, the photochemical production of $^{196}$Hg enriched $Hg_2Cl_2$ has been found to be photon limited when enough product is deposited in the reaction zone. Thus, this embodiment involves a system in which a packed bed of randomly oriented quartz tube sections is intermittently replaced with uncoated packing can substantially reduce this problem. A minimum residence time can be estimated using a one dimensional model of the product deposition.

Figure 1:
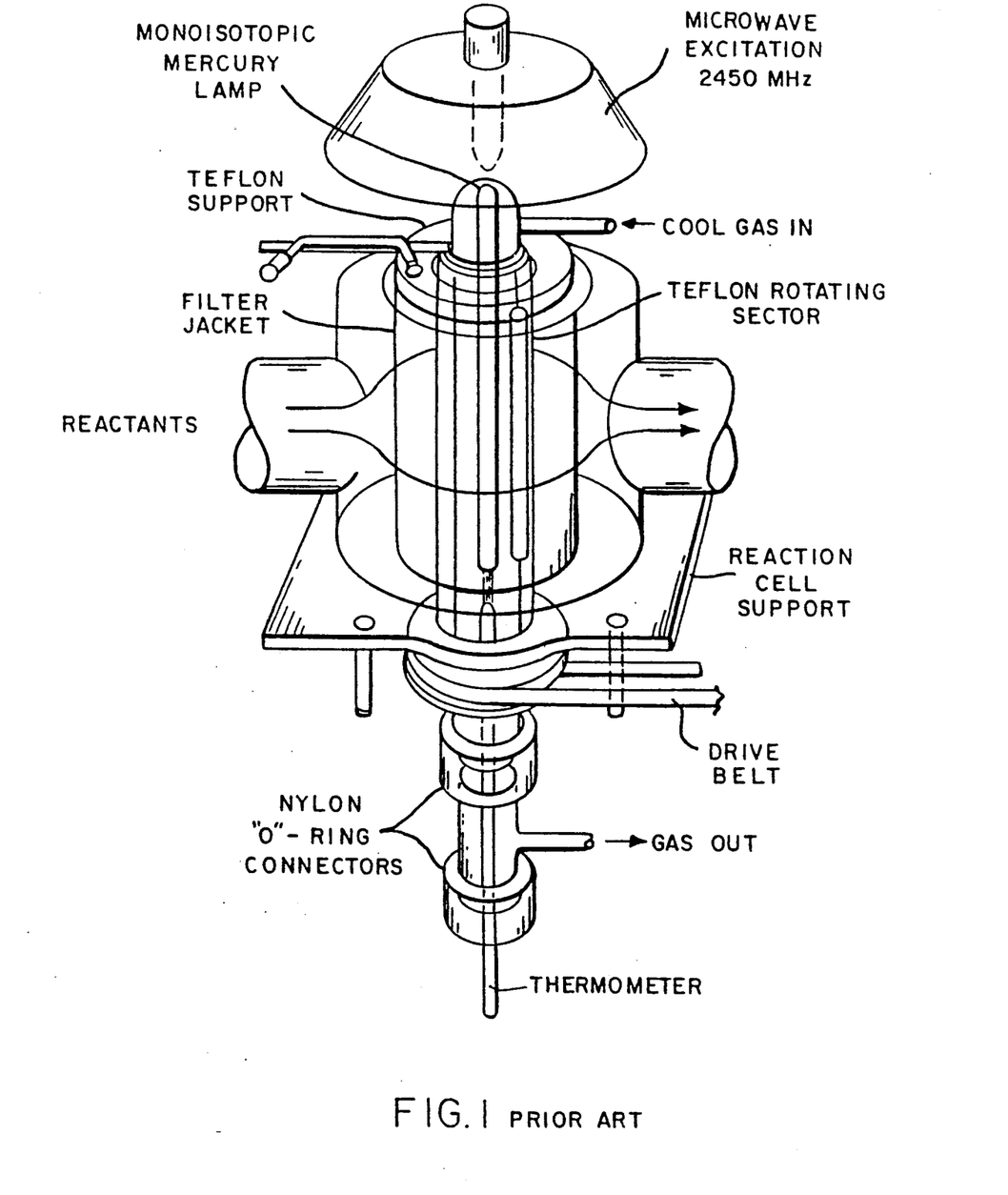
FIG. 1 illustrates the monoisotopic lamp and reaction cell (or, photoreactor) of Webster and Zare from "Photochemical Isotope Separation of Hg-196 by Reaction with Hydrogen Halides," *J. Phys. Chem.*, 85: 1302–1305 (1981), the teachings of which are hereby incorporated herein by reference.
Figure 2A:
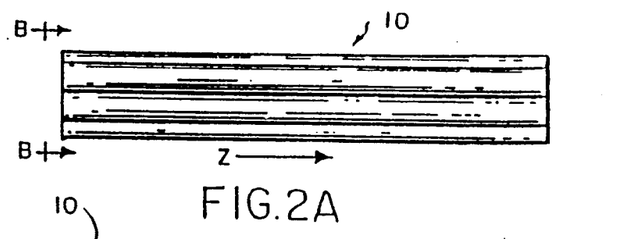
FIGS. 2A, B, and C illustrate (in three views) a photoreactor 10, provided with a plurality of straight reactor tubes.
Figure 2B:
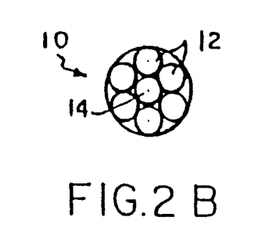
Figure 2C:
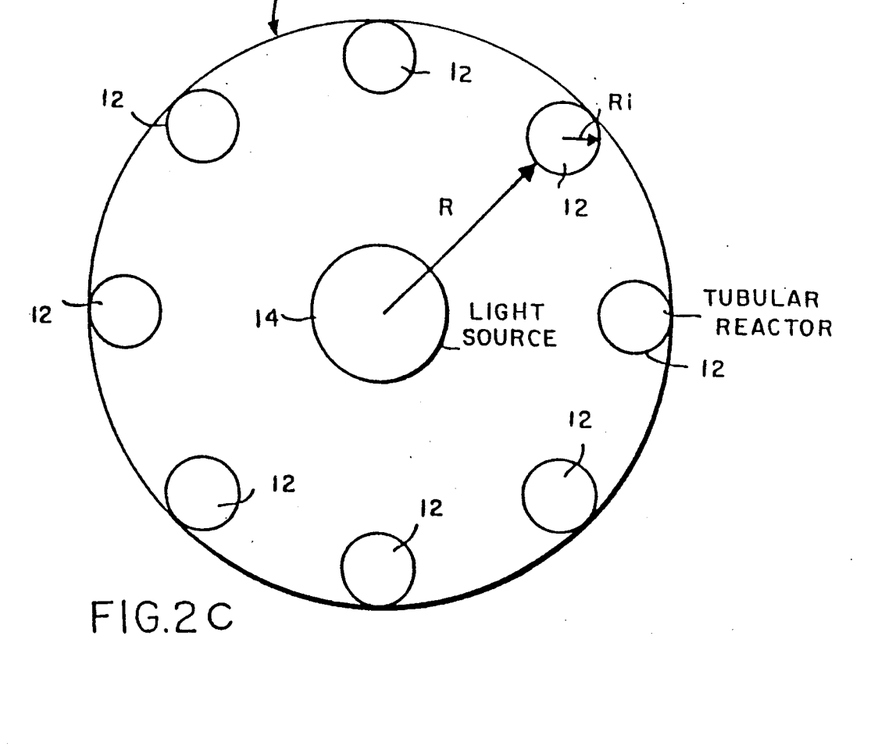

mined from the axis of the light source 14. In one preferred embodiment, eight straight reactor tubes having $r_i = 1.1$ cm, were situated around the light source, on an R=5 cm radius circle.

For different photoreactor types, two sets of runs were carried out, one with inner tubes one without. The results are summarized in Table 1. It should be noted that the enrichment factor E and the average (QU+YE/2) are consistently higher for the internal tube condition than no internal tube.

TABLE 1

| | | | Internal Tubes vs. No Internal Tubes | | | | | | |
|---|---|---|---|---|---|---|---|---|---|
| RUN ID | $T_B$ | INTERNAL TUBES | Q | U | Y | E | QU | YE | $\frac{QU + YE}{2}$ |
| 1 | 72 | Y | 9.31 | 0.0905 | 0.294 | 2.22 | 0.840 | 0.653 | 0.746 |
| 2 | 72 | Y | 9.96 | 0.078 | 0.251 | 2.34 | 0.760 | 0.587 | 0.674 |
| 3 | 72 | Y | 9.50 | 0.084 | 0.272 | 2.28 | 0.800 | 0.620 | 0.710 |
| 4 | 72 | N | 10.85 | 0.057 | 0.249 | 1.88 | 0.618 | 0.466 | 0.542 |
| 5 | 62 | Y | 4.90 | 0.132 | 0.229 | 2.40 | 0.647 | 0.550 | 0.548 |
| 6 | 62 | N | 5.51 | 0.084 | 0.234 | 2.21 | 0.466 | 0.517 | 0.492 |
| 7 | 52 | Y | 2.60 | 0.168 | 0.176 | 3.19 | 0.438 | 0.526 | 0.482 |
| 8 | 52 | N | 2.65 | 0.152 | 0.213 | 2.61 | 0.402 | 0.556 | 0.479 |

DETAILED DESCRIPTION OF THE PREFERRED EMBODIMENTS

Transmission probe measurements indicate that during a photochemical $^{196}$Hg enrichment process transmitted U.V. radiation into the reaction zone decreases due to product formation. It is this effect which is believed responsible for the fall off in feedstock utilization as function of time.

Observations indicate that product forms preferentially, under many reactor operating conditions, on the reactor wall closest to the incoming U.V. radiation. If this area or "window" is small the radiation fall off is more severe than if it is large due to the fact that the transmitted intensity (I) is given by:

$$I = I_O \exp -Sa$$

where
S = product thickness on window
a = transmission factor
$I_O$ = transmission for S=0

As the window area decreases S must increase if the amount of product is to be constant. Thus I is smaller for smaller windows and fixed product yields. It is noted that the decrement in I is exponential with increasing S.

In order to reduce the decrease in I versus product yield, the present inventors have considered a number of methods for increasing the deposition within the reactor cell.

One technique that has yielded improved processing results is an embodiment of the present invention, namely increasing the contact area by the placement of a plurality of straight quartz tubes into the reactor volume.

In order to increase the surface onto which product produced in a $^{196}$Hg photoreactor is deposited, small quartz tubes 5 mm ID and 7 mm OD were placed within the reactor volume. A comparison of one type of reactor, with and without these internal tubes, indicates an improved process using internal tubes.

FIGS. 2A, B, and C illustrate (in three views) a photoreactor 10, provided with a plurality of straight reactor tubes 12 (each having a radius, $r_i$), placed on the circumference of a circle defined by radius R (as deter-

DEFINITIONS $T_B$ = reactor temperature, degrees C.
Q = feedstock flow rate in grams/hour
U = utilization factor
Y = yield in grams/hour
E = enrichment factor
QU = Q multiplied by U, grams/hour
YE = Y multiplied by E, grams/hour Another preferred embodiment of the present invention is a multi-tube reactor as described above, randomly packed with additional internal straight tubing. The packed internal straight tubing yields a somewhat improved process over the mere presence of multiple tubes. In one preferred system, a maximum YE=0.6 g/hr was found with E=2.3.

This embodiment is based in part upon the observation of a large build-up of product at the upstream ends of the straight tube packing as well as on surfaces perpendicular to the flow on the downstream manifold. Thus, the use of several short pieces of straight quartz tubing, either 2.0 cm or 1.0 cm long, placed in a random orientation within each of the straight reactor tubes was considered.

Table 2 compares the processing results of straight tube and randomly oriented tube section data. As seen from Table 2, YE and E are higher for the randomly packed bed than straight tube bed.

TABLE 2

| RUN ID | $T_B$ °C. | Q g/hr | U | Y g/hr | E | YE g/hr | $P_{TOT}$ Torr |
|---|---|---|---|---|---|---|---|
| 1 Straight Tubes | 72 | 9.5 | 0.084 | 0.27 | 2.3 | 0.62 | 2.8 |
| 2 | 74 | 8.4 | 0.24 | 0.52 | 3.6 | 1.9 | 3.5 |
| 3 Random Tubes | 73 | 13.7 | 0.14 | 0.48 | 5.4 | 2.6 | 2.5 |

It has also been discovered that the entrainment of vapor of deposited product is a potentially important source of scrambling and reduction in utilization of $^{196}$Hg feedstock. A known component of the enriched product is $Hg_2Cl_2$, which can evaporate as HgCl. The vapor is then entrained and transported with the gas flow. A portion of the vapor can be redeposited on the surface of the reactor vessel.

Figure 3A:
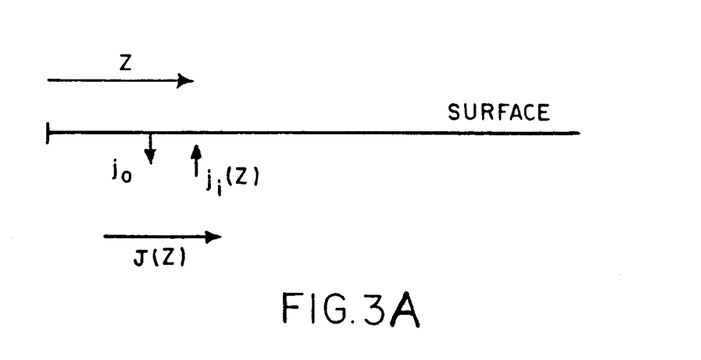
FIG. 3A represents a steady state model for product deposition on a surface within a photochemical $^{196}$Hg reactor.
Figure 3B:
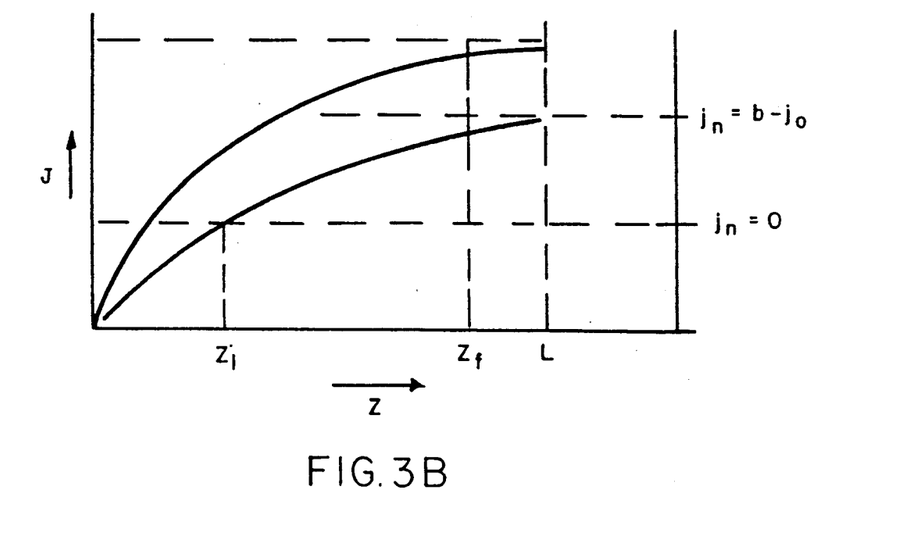
FIG. 3B is a graphic representation of the results derived from the Steady State Model, showing a plot of J v. Z, from which the Equations (1)–(10) may be derived.

This basic process can be modeled with the following definitions:

V or VA = volumetric flow velocity for carrier gas
$v_T$ or $(vA)_T$ = volumetric flow velocity of entrained product onto a surface
$n_p$ = density (molecules/unit volume) of product in vapor phase
J = product flowing along reactor tube, molecules/sec.
L = length of reactor tube
z = distance flow travels downstream along reactor tube
dz = small increment of z
C = rate of product formation
$j_o$ = product current per unit length along z evaporating off of surface
$j_i$ = product current per unit length along z into surface
$j_n = j_i - j_o$ = net product current onto surface per unit length
$a = (V_T/V)(1/L)$
$b = (CV/L) + j_o$
$z_c$ = z value for which $j_n = 0$
$F_n$ = net product current onto surface FIGS. 3A and 3B illustrate a steady state model for product deposition on a surface within a photochemical $^{196}Hg$ reactor. Given the above definitions, and referring to FIGS. 3A and 3B, one can derive the following equations:

$$dJ(z) = \left(-j_n + \frac{CV}{L}\right)dz \quad (1)$$

$$j_i = \frac{V_T n_p(z)}{L} = \frac{V_T}{V \cdot L} J(z) = aJ(z) \quad (2)$$

Thus $$\frac{d}{dz} J + aJ = b \quad (3)$$

Note that $J_o$ is assumed independent of z
Thus $$J = b/a \, (1 - e^{-az}) \quad (4)$$

and $$j_n = aJ - j_o = b(1 - e^{-az}) \quad (5)$$

A critical z value occurs $z_c$ at which $j_n = 0$. The reactor length L must satisfy the equation:

$$L > z_c \quad (6)$$

if net product is to deposit on the reactor tube.

Setting $j_n = 0$ and solving equation (5) for z, one finds:

$$z_c = \frac{1}{a} \ln\left(\frac{1}{1 - j_o/b}\right) \quad (7)$$

Equation (7) and the definition of "a" implies an approximate linear dependence of flow velocity on $z_c$. Furthermore, since the randomly oriented packing produces a higher $V_T$ compared to straight tube packing, $z_c$ is reduced for randomly oriented packing.

The yield of product area is obtained from:

$$F_n = \int_{z_c}^{L} j_n dz \quad (8)$$

Qualitatively the prediction of a $z_c$ which for $z < z_c$ no product appears, agrees with observation. The near constant deposition after a certain distance $z_f$ also agrees with observation. It is also noted that $z_c$ increases with V as equation (7) suggests.

A critical flow velocity $V_c$ exists such that $z_c = L$ when $V = V_c$. From equation (7) we have approximately:

$$V_c \approx V_T \quad (9)$$

The use of randomly oriented packing substantially increases $V_T$ relative to straight tube packing. This permits a higher V for the same $z_c$ which in turn increases $F_n$ since more of the reactor tube is being used for product deposition. A more precise analysis can be carried out using equations (8), (2), (5), and the definition of $j_n$. Equation (8) becomes:

$$F_n = CV(1 - V/V_T)(1 + \ln(1 + j_o L/CV)) + (j_o(V/V_T)L + CV(V/V_T)\exp(-V_T/V) \quad (10)$$

wherein $L \geq z_c$

As set forth above, the use of randomly oriented sections of quartz tubing has shown to improve the (YE) factor relative to straight tube packing. However, U, the utilization, still decreases as run time progresses. Using the randomly oriented packing most of the product deposition is on the packing rather than on the outer tube.

Figure 4:
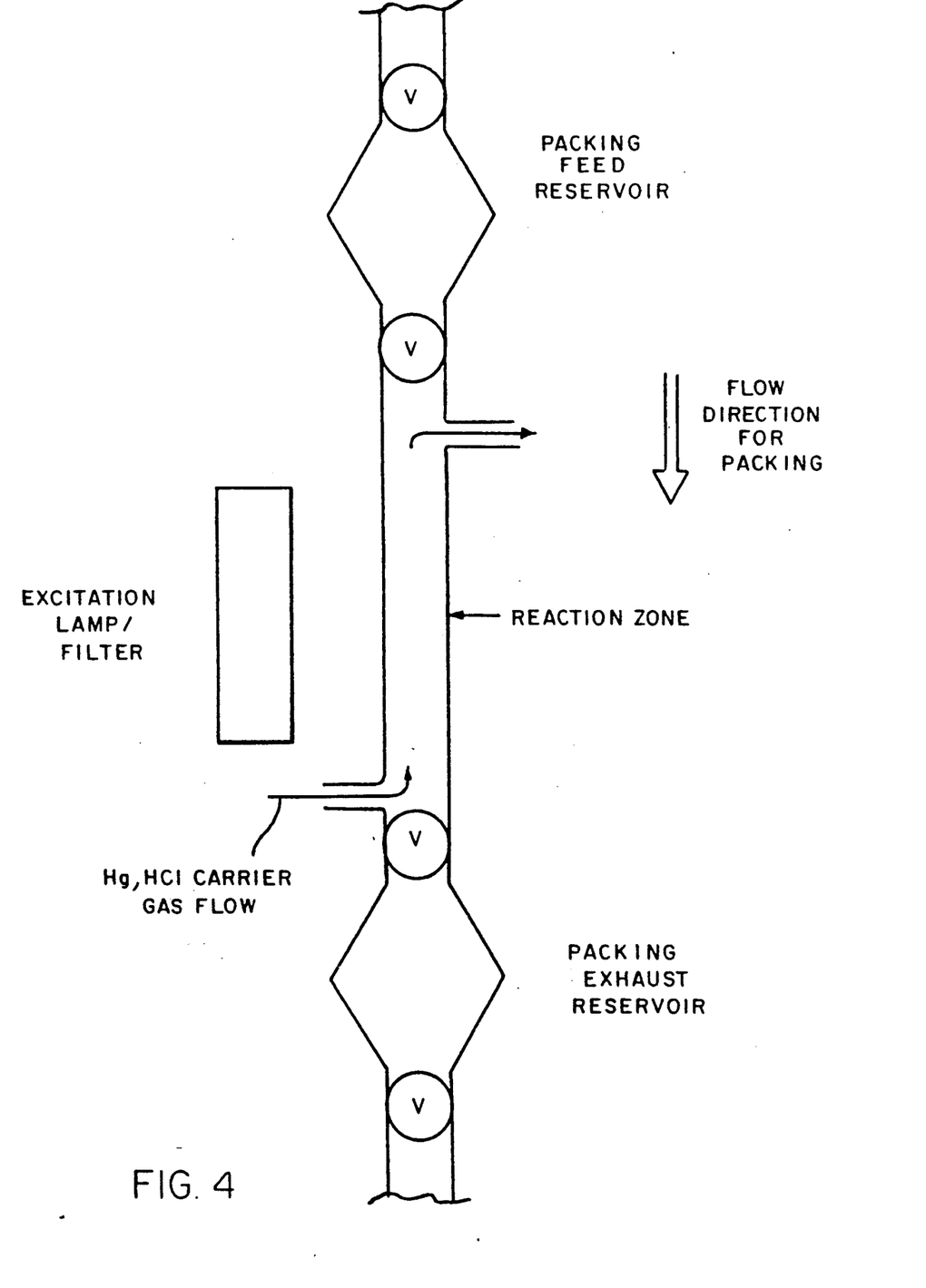
FIG. 4 is a schematic of how this could be implemented using vertical reactor tubes and gravity feed and removal of the packing.

It has been discovered that by removing the packing after a particular run interval and replacing it with clean packing the overall utilization can be increased. FIG. 4 is a schematic of how this could be implemented using vertical reactor tubes and gravity feed and removal of the packing. Additional packing of different configuration could be used to help mechanically remove any product deposited on the reactor tube walls.

By proper cycling of the vacuum valves the gas flow and excitation lamp need not be interrupted during the flow of packing.

The minimum time for the packing to remain in the reaction zone can be estimated using the calculation in reference 4. Here it was found that the net deposited current density of product per length was given as $$j_n = b(1 - e^{-az}) - j_o \quad (11)$$

where $j_o$ represents product evaporation off of a surface. Consider a small element of volume moving a distance z in time t with a velocity V, $z = tV$ $$dJ/dz = 1/V \, dj/dt \quad (12)$$

Now V also refers to the flow velocity of a fluid element. The frame of reference has been shifted so that an observer is moving with this fluid element along the reactor tube. Using the relationships previously defined herein above, one can derive the following equation:

$$(d/dz)J = b - aJ = (1/V)(dJ/dt) \quad (13) \text{ or}$$

$$(dJ/dt) + VaJ = Vb \quad (14)$$

Equation (14) has the same form as that of equation (3) supra, with t replacing z.

Figure 5:
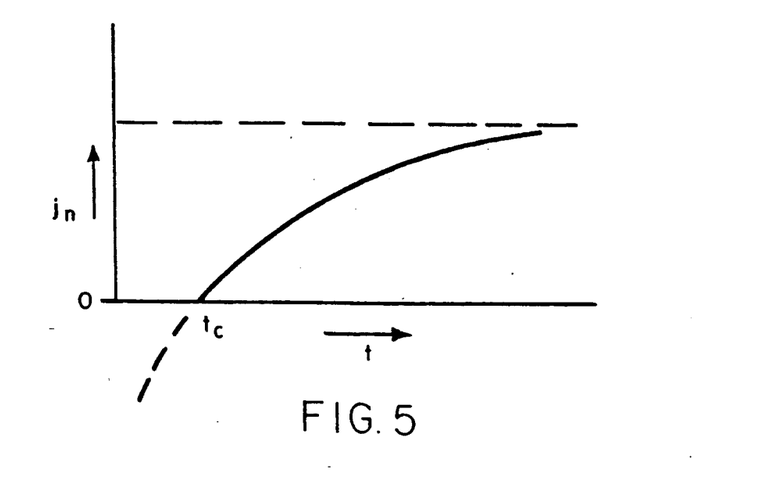
FIG. 5 shows a plot of $j_n$ versus t. At time $t_c$ there is a net deposition of product. This represents the minimum time the packing material must be in the reaction zone for deposition to occur.

FIG. 5 shows a plot of $j_n$ versus t. At time $t_c$ there is a net deposition of product. This represents the minimum time the packing material must be in the reaction zone for deposition to occur.

All of the standard elements of the reactor system, i.e., the lamp, the filter, and the reactor vessel are formed of a material which is transparent to the desired excitation radiation, particularly 253.7 nm (2537 Å) for $^{196}Hg$. One preferred material is quartz. While the lamp used in the reactor of the present invention may be any low pressure (e.g., about 2.5 Torr) electric discharge type lamp which transmits radiation of about 253.7 nm, those using microwave cavities for the excitation are preferred.

An especially preferred lamp comprises an electroded mercury-inert gas lamp. At least two electrodes are positioned and sealed at each end of a sealed lamp envelope which contains mercury vapor and one or more inert gases. The sealed lamp envelope is surrounded at least in part by an elongated tube which defines a region for controlling a heat exchange medium which controls the temperature of the inner, sealed lamp envelope.

In one embodiment, uniform temperature is created in the Hg lamp by circulating $H_2O$ at a predetermined temperature about an isolated section of the lamp. Other fluids, or inert gases such as argon, helium, xenon and neon, can be selected depending on their boiling point behavior to provide the desired uniform temperature of the inner discharge envelope.

The circulating heat transfer medium also prevents the formation of $O_3$ (ozone) by purging $O_2$ in the vicinity of the lamp. Ozone is created when $O_2$ is exposed to 185 nm radiation which may be emitted by the lamp. Ozone, in turn, absorbs various wavelengths of radiation emitted from the lamp. This is undesirable because radiation having a wavelength of 253.7 nm, useful for the photochemical separation of $^{196}Hg$, is absorbed of $O_3$. Thus, in a preferred embodiment, a fluid or inert gas is circulated about the entire exterior of the lamp envelope, thereby purging all of the $O_2$ from the immediate vicinity of the envelope. This allows for a greater emission intensity of the particular, desired radiation from the lamp envelope.

In a preferred embodiment, the outer lamp jacket comprises a quartz cylinder. This outer jacket serves several purposes. First, it allows for the use of a gas purge, if desired, for eliminating $O_2$ about the transmission section, thereby reducing $O_3$ formation. Second, if the outer jacket is designed to be demountable, it permits the interchange of different inner lamp envelopes. This makes possible the isolation of different Hg isotopic distributions using the same outer jacket. Also, lamp envelopes having different diameters can be used to affect the emitted linewidth of radiation.

The fact that the outer tube can be demountable allows for the use of outer tubes of different types of materials which can selectively filter certain emitted wavelengths. For example, by changing the outer tube material to Vycor 7910, it is possible to filter wavelengths below 200 nm thereby eliminating ozone formation in the region surrounding the lamp.

Figure 6:
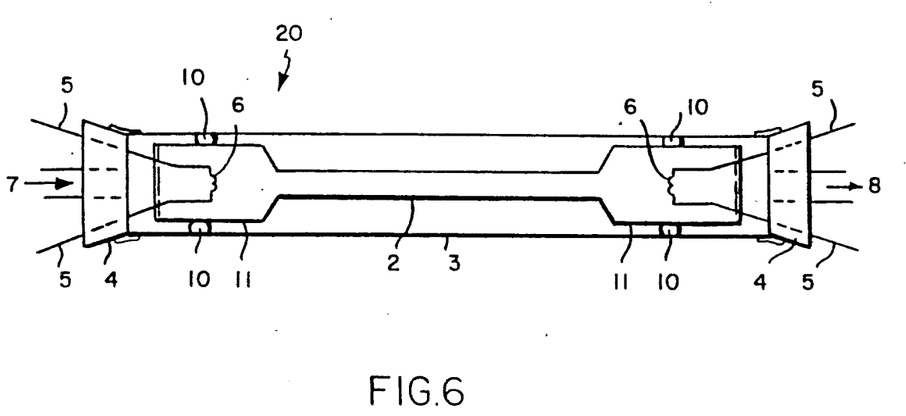
FIG. 6 illustrates a preferred lamp for use in the reactor of the present invention for the isotopic enrichment of $^{196}$Hg.

FIG. 6 illustrates the preferred lamp which is used in the reactor of this invention.

The mercury lamp 20 of FIG. 6 comprises an inner lamp envelope 2 and an outer jacket 3. In the preferred embodiment, both the envelope 2 and the outer jacket are constructed of quartz. The envelope 2 can be of various diameters depending on the desired optical depth. A larger diameter provides greater power density and broader bandwidth. For the isotopic separation of $^{196}Hg$, the inner diameter of the envelope is typically about 10 nm. The envelope 2 typically contains a source of Hg such as elemental Hg as well as an inert gas such as argon. However, any inert gas which is compatible with Hg vapor can be used. Typically, between about 1 and 2 mg of Hg is contained within lamp envelopes which have an inner diameter of about 10 mm. The length of the lamp can be from about 30-150 cm with a preferred length of about 40 cm.

A tapered stopper 4, typically of an elastomeric material, is disposed at each distal end of the outer jacket 3 and serves to substantially center the outer jacket around at least one section of the envelope 2. Furthermore, the tapered stopper guides and positions an electrode lead 5 through both the stopper and the outer jacket, and into the envelope where it provides current for the electrodes 6. In the preferred embodiment, the electrodes are shaped as coils and able to withstand a current of at least about 5 amperes. The tapered stoppers also contain openings in their centers which provide for an inlet 7 and outlet 8 stream of circulating heat transfer medium which is preferably water. The heat transfer medium circulates about at least one portion of the inner discharge envelope 2. The heat transfer medium then exits the lamp at outlet 8 contained in the outer jacket. Tubes, 11, preferably comprising a heat resistant glass are connected to each end of the envelope to provide regions to contain the electrodes and to further provide regions for mounting the envelope within the jacket. These tubes 11 are preferably separated from the outer tube with spacers 10 preferably comprising elastomeric materials. It is pointed out that the spacers 11 must have openings which allow the heat transfer medium to travel through the lamp.

The temperature of the inner envelope 2 is controlled by the temperature of the circulating heat transfer medium. As the temperature of the heat transfer medium is increased or decreased, the corresponding temperature of the inner envelope also increases or decreases. The linewidth of the emitted radiation is typically affected greatly by temperatures between 15° C. and 50° C. The emission intensity depends strongly on the temperature of the inner envelope.

The entire lamp assembly can be placed within a mercury vapor filter. In one preferred embodiment, the filter comprises a hollow, axial elongated torus containing mercury vapor and an inert gas. This structure can be formed by the combination of two tubes, preferably quartz, where an inner tube is inserted into an outer tube and the tubes are sealed at both ends. This encloses a medium which can be made to contain a gaseous Hg vapor medium which transmits wavelengths of light desirable for the photochemical separation of $^{196}Hg$ or specific isotopes of Hg.

In a preferred embodiment of this invention $^{196}Hg$ is produced by enriching mercury compounds using radiation with a wavelength of 253.7 nm. The control of the specific wavelength is very dependent upon the vapor equilibrium temperature within the lamp envelope, which depends, in turn, upon the lowest temperature within the envelope. The vapor pressure of Hg within the envelope (for useful mercury isotope separation) and the intensity of the emitted radiation are proportional with a variation of about 10-15%.

If the intensity of radiation emitted from the lamp increases, the corresponding linewidth of the emitted radiation also increases. This causes other isotopes of mercury to become excited. Such an effect is undesirable, as it leads to a separation which yields a product having lower isotopic specificity. Thus, it is important to control the vapor pressure of the lamps to ensure that radiation of the proper linewidth is emitted. For a further explanation of the relationship between lamp temperature, radiation intensity and linewidth of the radiation see Maya et al., *Science*, 26: 435-436 (1984), the teachings of which are incorporated herein by reference.

The present invention has been described in detail, including the preferred embodiments thereof. However, it will be appreciated that those skilled in the art, upon consideration of the present disclosure, may make modifications and/or improvements on this invention and still be within the scope and spirit of this invention as set forth in the following claims.

What is claimed:

1. In a photochemical reactor useful for the isotopic enrichment of a predetermined isotope of mercury comprising a reactor cell and a monoisotopic light source; the improvement comprising:

a plurality of transparent, straight reactor cell tubes disposed axially within the internal volume of said reactor cell to increase the surface area thereof for production deposition.

2. The improved photoreactor of claim 1, which further includes a packing material in said reactor cell tubes, said packing material comprising a plurality of randomly oriented pieces of glass or quartz, which packing material increases the enrichment factor (E) and utilization (U) of said photoreactor when compared to a photoreactor having a non-packed reactor cell.

3. The improved photoreactor of claim 2, which further includes means for removing the packing material from the reactor cell tubes after collection of product and replenishing said reactor cell tubes with fresh packing material.

4. The improved photoreactor of claim 3, wherein the means for removing and replenishing the reactor cell tubes comprises a moving bed of packing.

5. The improved photoreactor of claim 4, wherein the movement of the packing bed is provided by gravity feed.

* * * * *